US007503102B2

(12) United States Patent
Hsieh

(10) Patent No.: US 7,503,102 B2
(45) Date of Patent: Mar. 17, 2009

(54) PULLING CHAIN STORAGE DEVICE OF A SCROLLING DOOR MACHINE

(76) Inventor: Chung-Hsien Hsieh, No. 116, Fen-Liao Road Sec. 1, Lin-Kou Hsiang, Taipei Hsien (TW)

( * ) Notice: Subject to any disclaimer, the term of this patent is extended or adjusted under 35 U.S.C. 154(b) by 737 days.

(21) Appl. No.: 11/225,662

(22) Filed: Sep. 12, 2005

(65) Prior Publication Data

US 2007/0056867 A1 Mar. 15, 2007

(51) Int. Cl.
*F16G 15/00* (2006.01)

(52) U.S. Cl. ....................... 24/116 R; 24/116 A; 59/93; 294/82.1; 70/49; 70/53

(58) Field of Classification Search ....................... None
See application file for complete search history.

(56) References Cited

U.S. PATENT DOCUMENTS 1,066,202 A * 7/1913 Gibson ..................... 24/116 R
1,325,538 A * 12/1919 Smith ......................... 292/264
1,496,793 A * 6/1924 Unger ........................ 292/264
1,543,467 A * 6/1925 Wrigley .................... 24/116 R
3,375,557 A * 4/1968 Parr ......................... 24/116 R
4,560,191 A * 12/1985 Grassi ........................ 292/264
7,000,292 B2 * 2/2006 Beaudoin et al. .......... 24/116 R

* cited by examiner

*Primary Examiner*—Jack W. Lavinder
(74) *Attorney, Agent, or Firm*—Bucknam and Archer

(57) ABSTRACT

A pulling chain storage device for a scrolling door machine is provided to tie the chain that can be pulled manually when the scrolling door machine is malfunctioned. The storage device includes a vertical fixing section at an end and a horizontal tying end at the other end, and the tying section includes at least one opening section, and the opening section includes an external end and an internal end, and the width of the opening section is tapered from the external end to the internal end, such that a pairs of suspending arms are formed between the internal end of the opening section and the hollow hole, so as to tie a chain to a flexible suspending arm and prevent the chain from being jammed in the storage device. The chain can be easily released even if the chain is jammed.

15 Claims, 4 Drawing Sheets

PULLING CHAIN STORAGE DEVICE OF A SCROLLING DOOR MACHINE

BACKGROUND OF THE INVENTION

1. Field of the Invention

The present invention relates to a pulling chain storage device of a scrolling door machine, and more particularly to a storage device having a good flexible structure and capable of preventing the pulling chain from being jammed by accident.

2. Description of the Related Art

In addition to having an electric driving mechanism for driving a scrolling door under normal operating conditions, a scrolling door machine also includes a mechanism for manually pulling a chain under abnormal operating conditions. Another scrolling door machine of a refractory scrolling door includes the foregoing basic components and also has a brake release rod installed on an external side of the scrolling door machine, and the brake release rod is usually pulled by a cable to release a brake and facilitate operating the pulling chain mechanism manually. Under normal conditions, the chain and the brake release cable are stored in a storage device at a hidden place or a hard-to-reach place. To prevent the chain from being moved by accident, a lock is usually installed onto the storage device.

In FIG. 1, a prior art pulling chain storage device 100 of a scrolling door machine comprises a vertical fixing section 101 for fixing the storage device 100 at an appropriate position and a pair of vertical aslant side plates 102 are extended on both sides, and the side plates 102 are tapered downward, and an expanded guiding section 103 is formed at the top end for guiding a chain 110, and a tapered tying section 103*a* is formed at the lower end for tying the chain 110. In addition, a pair of circular holes 104 are built at the external side of a corner of the tying section 103*a* for hanging the lock, and a brake release cable storage device 105 is installed at a corner of an internal side of the guiding section 103. In FIG. 2, another prior art pulling chain storage device 200 of a scrolling door machine comprises a vertical fixing section 201 for fixing the storage device 200. A tying section 202 is extended horizontally towards an end of the fixing section 201, and the tying section 202 forms a sealed L-shape opening section 202 for tying the chain 210.

Although the prior art pulling chain storage device can satisfy the requirements of storing the chain, yet the tying section of the prior art is designed with a rigid structure without a buffer flexibility. In other words, the rigid structure will be jammed easily when the chain is pulled by mistake. Particularly, when power failure occurs, the chain is jammed by accident before the chain is completely released. The chain is stuck and cannot be untied or operated manually. Under this condition, the larger the force, the tighter is the jam. In a more serious case, it may need to break the storage device or cut the chain for a release. The design of the traditional pulling chain still requires further improvements.

SUMMARY OF THE INVENTION

Therefore, it is a primary objective of the present invention to provide a pulling chain storage device of a scrolling door machine, and the device has a good flexible structural design capable of preventing the pulling chain from being jammed with the storage device by pulling the chain by accident. Even if the chain is pulled and jammed by accident, the pulling chain can be released from a jam easily.

To achieve the foregoing objective and other objectives of the present invention, the pulling chain storage device of a scrolling door machine of the invention comprises a vertical fixing section disposed at one end and a horizontal tying section disposed at the other end; wherein the tying section forms a pair of parallel opening sections thereon, and each opening section includes an external end and an internal end, and the width of the external end is slightly larger than the diameter of the chain, and the width of the internal end is slightly smaller than the diameter of the chain, and the opening section is tapered from the external end to the internal end, and its end forms an expanded hole having a diameter substantially equal to the diameter of the chain. A pair of hollow holes respectively disposed on the left and right sides of the internal side of the opening sections form a pair of flexible suspending arms.

Since the suspending arms are flexible structures and have good buffer properties, therefore when the chain is tied to the pulling chain storage device, then the chain is pushed into the opening section from a side. If a force is exerted slightly from the external end with a larger width to the internal end with a smaller width, the pulling chain is embedded into the hole at the end and tied and held by the suspending arm. On the other hand, if a slight force is exerted to pull the chain, then the chain is released from the suspending arm, so as to prevent the pulling chain from being jammed by accident. Even if the pulling chain is jammed by accident, the pulling chain can be released easily. Thus, the present invention can overcome the shortcomings of the traditional pulling chain storage device.

DETAILED DESCRIPTION OF THE PREFERRED EMBODIMENTS

Figure 1:
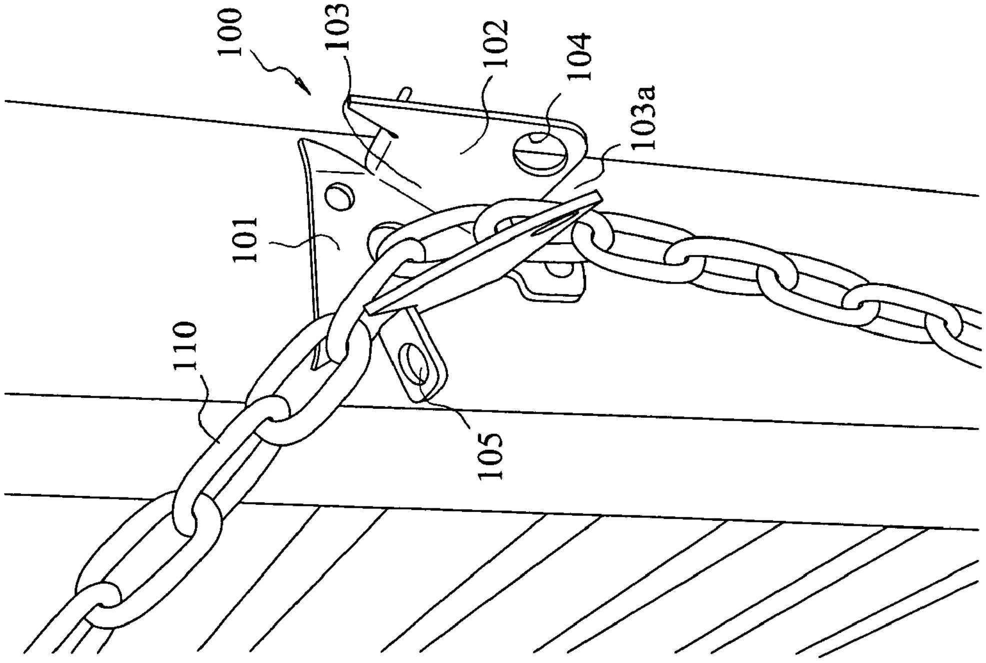
(PRIOR ART) FIG. 1
FIG. 1 is a schematic view of the operation of a prior art pulling chain storage device.
Figure 2:
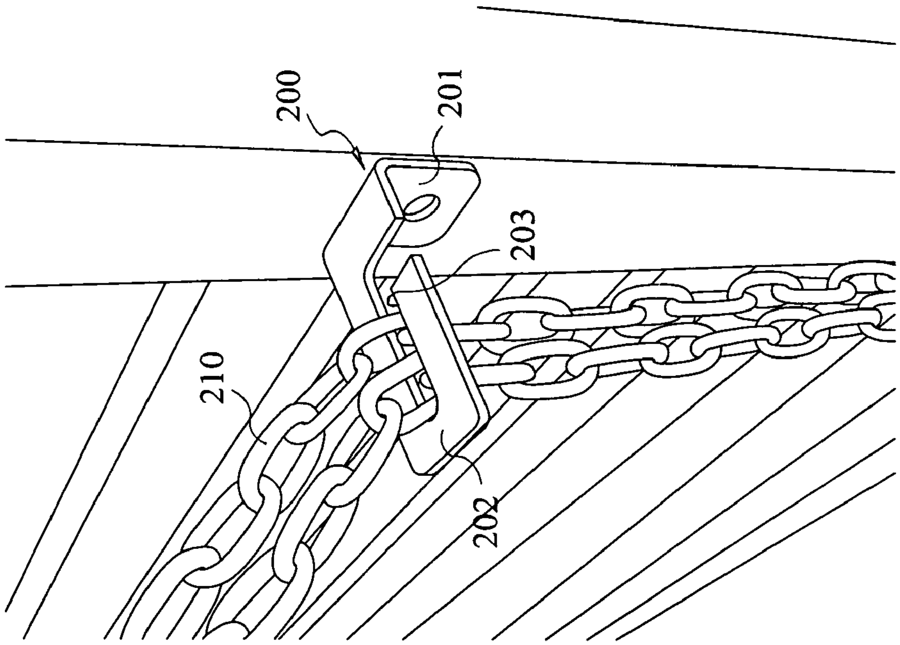
(PRIOR ART) FIG. 2
FIG. 2 is a schematic view of the operation of another prior art pulling chain storage device.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 4:
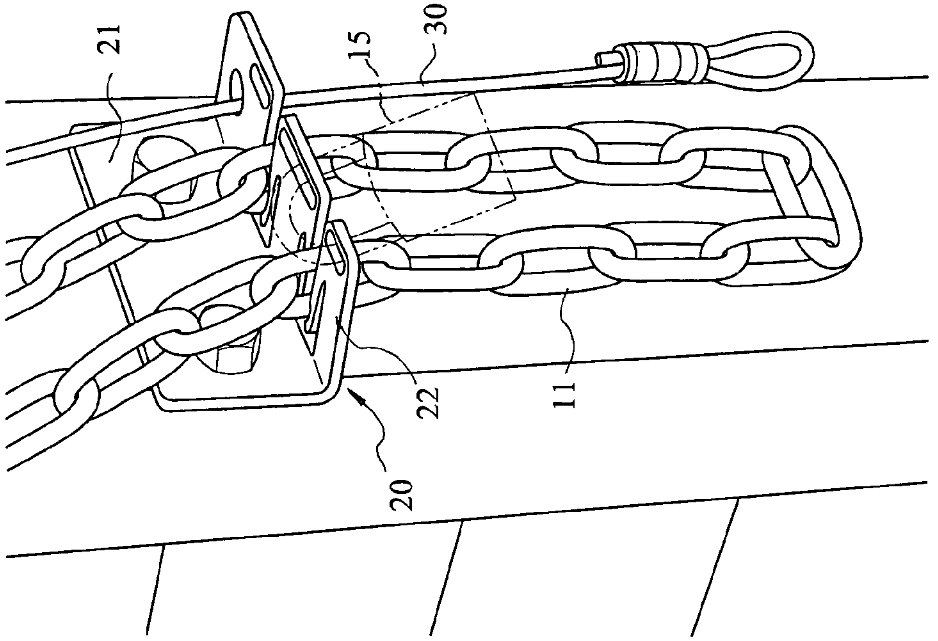
FIG. 4 is an enlarged view of Section A-A as depicted in FIG. 3.
Figure 3:
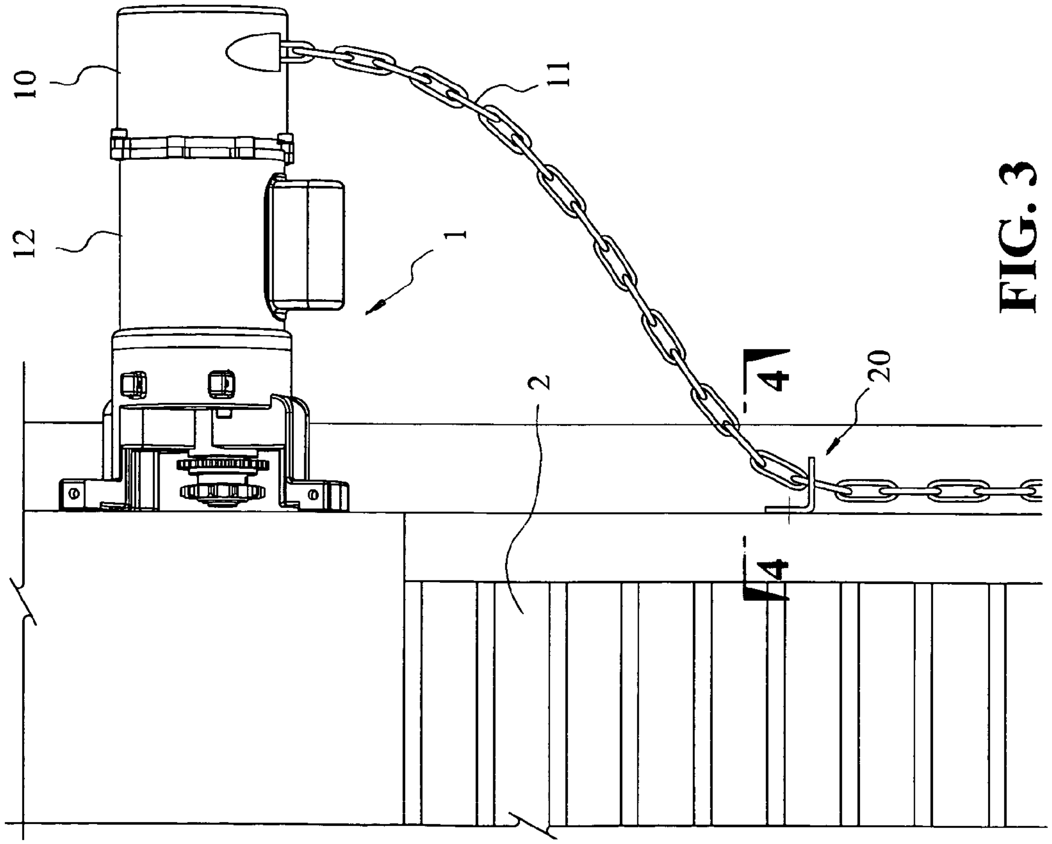
FIG. 3 is a schematic view of the pulling chain storage device of a scrolling door machine according to a preferred embodiment of the present invention.

Referring to FIGS. 3 and 4 for the pulling chain storage device 20 of a scrolling door machine in accordance with the present invention, the scrolling door machine 1 is used to drive an electric driving mechanism 12 of a scrolling door 2 under normal conditions and the storage device 20 also includes a manual pulling chain mechanism 10 for abnormal conditions, such that a chain 11 is driven manually to drive the manual puling chain mechanism 10 and operate the scrolling door 2. Further, the scrolling door machine for a refractory scrolling door comprises a brake release rod (not shown in the figure) extended out of an external casing of the scrolling door machine, and the brake release rod releases a brake by pulling a cable to facilitate a manual operation of the manual pulling chain mechanism 10. Under normal conditions, the chain 11 and the brake release cable 30 are stored in a storage device 20, and a lock 15 is provided for locking the chain 11 to the storage device 20 (as shown in FIG. 4) to prevent starting the machine by accident.

Figure 5A:
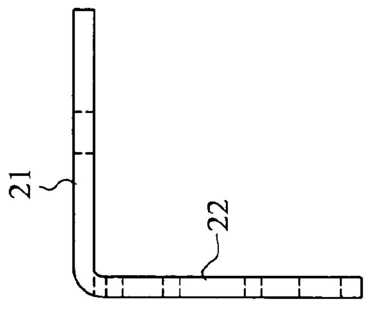
FIG. 5A is a side view of FIG. 5.
Figure 5:
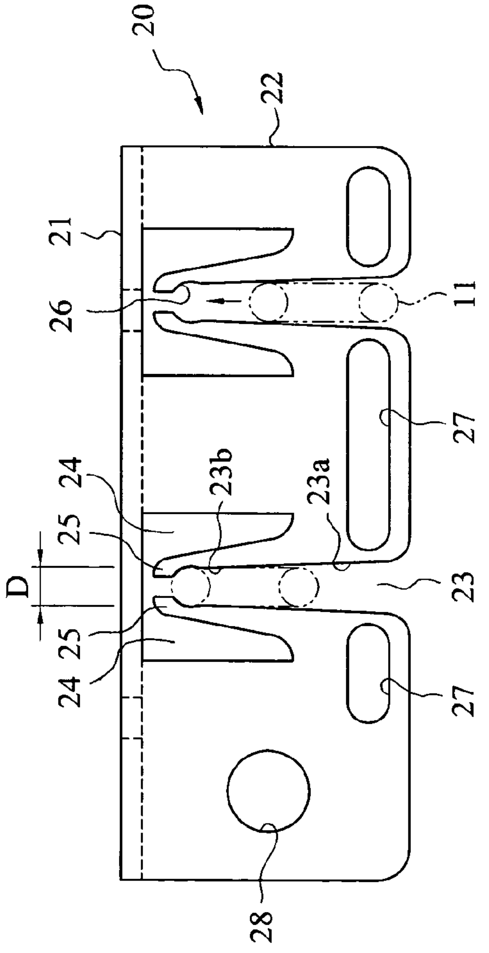
FIG. 5 is a planar view of a pulling chain storage device according to a first preferred embodiment of the present invention.
Figure 5B:
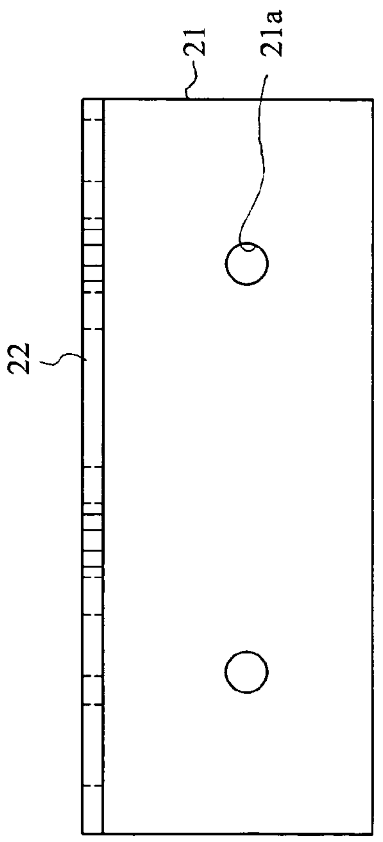
FIG. 5B is a front view of FIG. 5.

Referring to FIGS. 5, 5A and 5B, the pulling chain storage device 20 of a scrolling door machine of the invention forms a vertical fixing section 21 at one end and the fixing section 21 includes a plurality of screw holes 21*a* for fixing the storage device 20 in a hidden place or a hard-to-reach place, and a horizontal tying section 22 is disposed at another end; wherein the tying section 22 forms a pair of parallel opening sections 23, and the opening section 23 includes an external end 23*a* and an internal end 23*b*, and the width of the external end 23*a* is slightly larger than the diameter D of the chain 11, and the width of the internal end 23*b* is slightly smaller than the diameter D of the chain 11, and the opening section 23 is tapered from the external end 23*a* to the internal end 23*b*. An expanded hole 26 is formed at an end of the internal end 23*b*, and the hole 26 is substantially equal to the diameter of the chain 11. A pair of hollow holes 24 are formed respectively on the left and right sides of the internal end 23*b* of the opening section 23, and coupled to the pair of hollow holes 24 proximate to the internal end of the fixing section 21, such that a pair of suspending arms are formed between the internal end 23*b* of the opening section 23 and the hollow holes 24, and the width of the pair of the suspending arms becomes increasingly larger from the internal end 23*b* to the external end 23*a*, such that the suspending arms 25 have good flexibility. Further, the tying section 22 includes a plurality of slots 27 disposed on both sides of the external end 23*a* of the opening section 23 for allowing a lock 15 to pass through and lock the chain 11, and the tying section 22 at a fixed point forms at least one circular hole 28 for typing the brake release cable 30 of the scrolling door machine 1 as shown in FIG. 4.

Figure 6A:
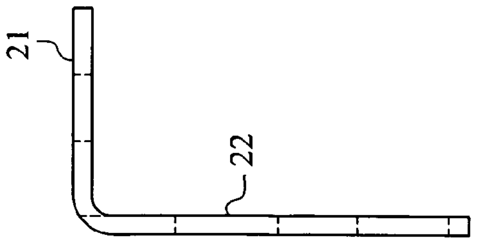
FIG. 6A is a side view of FIG. 6.
Figure 6:
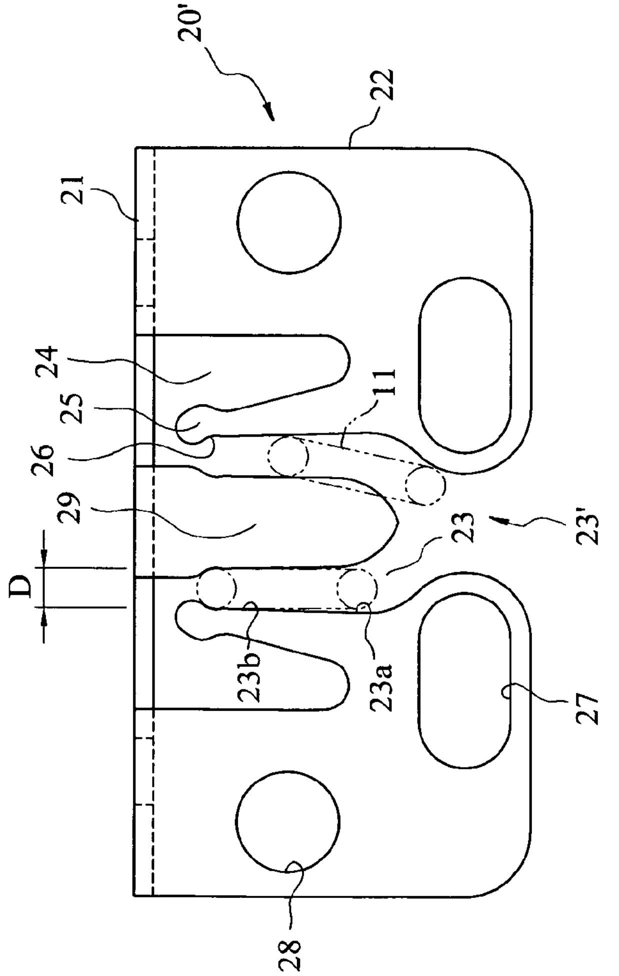
FIG. 6 is a planar view of a pulling chain storage device according to a second preferred embodiment of the present invention.
Figure 6B:
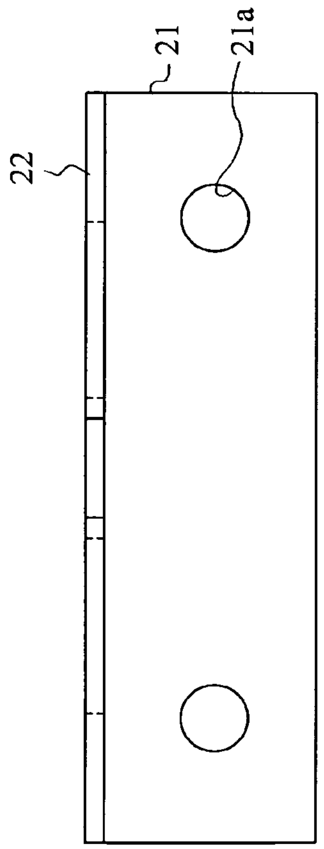
FIG. 6B is a front view of FIG. 6.

Referring to FIGS. 6, 6A and 6B for a second preferred embodiment of the present invention, the pulling chain storage device 20' of the invention is basically the same as the first preferred embodiment. A vertical fixing section 21 is disposed at an end of the pulling chain storage device 20', and the fixing section 21 includes a plurality of screw holes 21*a*, and a horizontal tying section 22 is disposed at the other end. The difference of the second preferred embodiment from the first preferred embodiment resides on that the tying section 22 forms a split opening 23', and a pair of parallel opening sections 23 split from a central section 29. The opening section 23 includes an external end 23*a* and an internal end 23*b*, and the width of the external end 23*a* is slightly larger than the diameter D of the chain 11, and the width of the internal end 23*b* is slightly smaller than the diameter D of the chain 11, and the width of the opening section 23 is tapered from the external end 23*a* to the internal end 23*b*, and an expanded hole 26 substantially equal to an end of the internal end 23*b*. A hollow hole 24 is formed separately on the left and right sides of the internal end 23*b* of the opening section 23 and coupled to the internal end 23*b* of the opening section 23 at a position proximate to an end of the fixing section 21, such that a suspending arm is formed between the internal end 23*b* of the opening section 23 and the hollow hole 24, and the width of the suspending arm 25 becomes increasingly larger from the internal end 23*b* to the external end 23*a*, so that the suspending arm 25 has good flexibility. In addition, the tying section 22 includes a slot 27 separately disposed on both sides of the split opening 23' for providing the lock 15 to pass through and lock the chain 11. The tying section 22 forms a pair of circular holes 28 at fixed points for tying the brake release cable 30 of the scrolling door machine 1.

In summation to the description above, the chain 11 is pushed from the side to the opening section 23 and a slight force is exerted from the wider external end 23*a* to pass the chain 11 to the narrower internal end 23*b*, and embedded into the hole 26 at the end and held by the suspending arm 25, when the chain 11 is tied to the pulling chain storage device 20, 20'. On the other hand, a slight force is applied to pull the chain 11 to be released from the holding of the suspending arm 25, if it is necessary to release the chain 11. Since the suspending arm 25 has a flexible structure, the suspending arm 25 has a good buffer characteristic for preventing the storage device 20, 20' from being jammed with the chain 11, when the chain 11 is pulled by accident. Even if there is a jam, the chain 11 can be released easily. The present invention not only provides high safety, but also improves the shortcomings of the traditional chain pulling device. The invention is definitely novel and complies with the patent requirements.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pulling chain storage device of a scrolling door machine, for tying a chain of said scrolling door machine when manually pulling a pulling chain mechanism during abnormal conditions, and said pulling chain storage device defining a vertical fixing section at an end and a horizontal tying section on the other end; wherein said tying section includes at least one opening section, and said opening section includes an external end and an internal end, and the width of said tying section is tapered from said external end to said internal end, and a pair of hollow holes are disposed on the left and right sides of said internal end of said opening section, such that a pair of suspending arms are formed between said internal end of said opening section and said hollow hole.

2. The pulling chain storage device of a scrolling door machine of claim 1, wherein said tying section forms a pair of parallel opening sections thereon.

3. The pulling chain storage device of a scrolling door machine of claim 2, wherein said external end of said opening section has a width slightly larger than the diameter of said chain, and said internal end of said opening section has a width slightly smaller than the diameter of said chain.

4. The pulling chain storage device of a scrolling door machine of claim 3, wherein said suspending arm has a width becoming increasingly larger from said internal end to said external end.

5. The pulling chain storage device of a scrolling door machine of claim 3, wherein said internal end of said opening section at an end forms an expanded hole having a diameter substantially equal to the diameter of said chain.

6. The pulling chain storage device of a scrolling door machine of claim 1, wherein said pair of hollow holes are coupled to said fixing section proximate to an internal end of said fixing section.

7. The pulling chain storage device of a scrolling door machine of claim 1, wherein said tying section forms a plurality of slots disposed on both sides of said external end of said opening section.

8. The pulling chain storage device of a scrolling door machine of claim 1, wherein said typing section forms at least one circular hole at a fixed point for tying a brake release cable of said scrolling door machine.

9. A pulling chain storage device of a scrolling door machine, for tying a chain of said scrolling door machine when manually pulling a pulling chain mechanism during abnormal conditions, and said pulling chain storage device defining a vertical fixing section at an end and a horizontal tying section on the other end; wherein said tying section includes at least one split opening and a pair of parallel opening sections split from a central section along said split opening, and said opening section includes an external end and an internal end, and the width of said opening section is tapered from said external end to said internal end, and a pair of hollow holes are disposed on the left and right sides of said internal end of said opening section, such that a suspending arm is formed between said internal end of said opening section and said hollow hole.

10. The pulling chain storage device of a scrolling door machine of claim 9, wherein said external end of said opening section has a width slightly larger than the diameter of said chain, and said internal end of said opening section has a width slightly smaller than the diameter of said chain.

11. The pulling chain storage device of a scrolling door machine of claim 10, wherein said suspending arm has a width becoming increasingly larger from said internal end to said external end.

12. The pulling chain storage device of a scrolling door machine of claim 10, wherein said internal end of said opening section at an end forms an expanded hole having a diameter substantially equal to the diameter of said chain 11.

13. The pulling chain storage device of a scrolling door machine of claim 9, wherein said pair of hollow holes are coupled to said fixing section proximate to an internal end of said fixing section.

14. The pulling chain storage device of a scrolling door machine of claim 9, wherein said tying section forms a plurality of slots disposed on both sides of said split opening.

15. The pulling chain storage device of a scrolling door machine of claim 9, wherein said typing section forms at least one circular hole at a fixed point for tying a brake release cable of said scrolling door machine.

* * * * *